Oct. 30, 1962 G. L. RICHARDS 3,061,681

COMMUNICATION SYSTEM INFORMATION TRANSFER CIRCUIT

Filed Sept. 21, 1959 3 Sheets-Sheet 1

INVENTOR.
GLENN L. RICHARDS

BY F. H. Henson

ATTORNEY

VARIABLE CAPACITOR – VCA
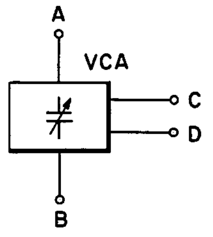
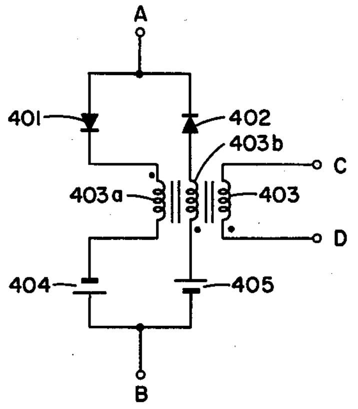
FIG. 4A FIG. 4B
VARIABLE CAPACITOR – VCB
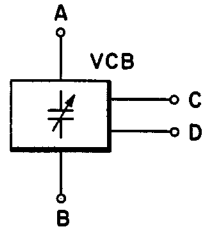
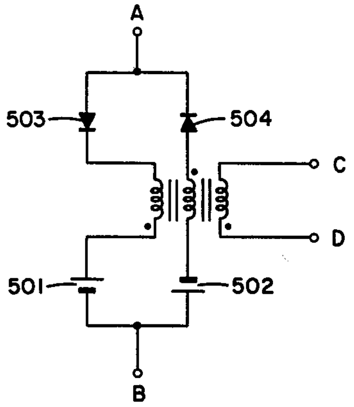
FIG. 5A FIG. 5B
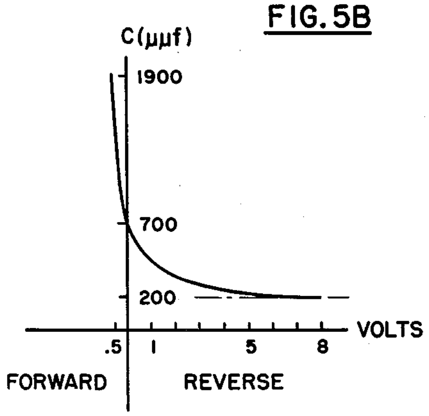
FIG. 6

Oct. 30, 1962 G. L. RICHARDS 3,061,681

COMMUNICATION SYSTEM INFORMATION TRANSFER CIRCUIT

Filed Sept. 21, 1959 3 Sheets-Sheet 3

United States Patent Office 3,061,681 Patented Oct. 30, 1962

3,061,681
COMMUNICATION SYSTEM INFORMATION TRANSFER CIRCUIT

Glenn L. Richards, Webster, N.Y., assignor to General Dynamics Corporation, Rochester, N.Y., a corporation of Delaware Filed Sept. 21, 1959, Ser. No. 841,230
17 Claims. (Cl. 179—15)

Figure 1:
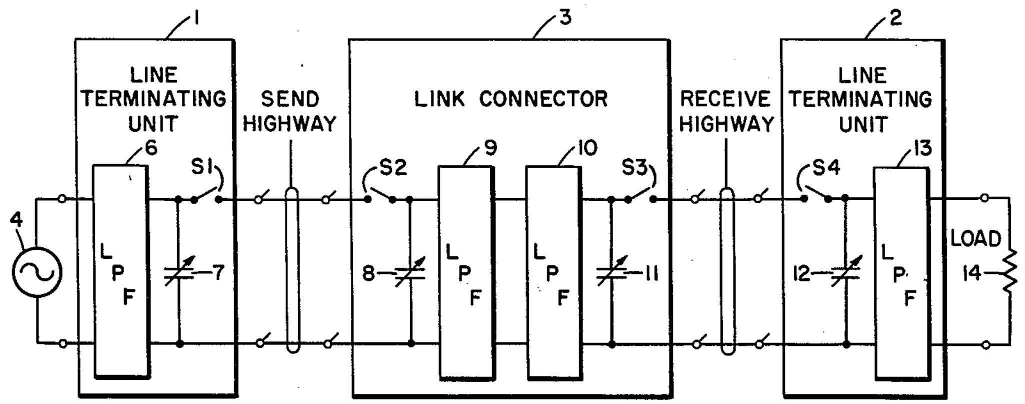

The present invention relates in general to communication systems and, more particularly, to circuits for storing and transferring information in communication systems.

Although the present invention has many applications, it is particularly adapted for use in the voice path of a time division multiplex communication system of the type shown and described in copending application Serial Number 814,926, filed May 21, 1959 and assigned to the same assignee as the present invention. In the system disclosed in the above-identified application, the lines of the system are interconnected by a transmission network, or highway, of the time division channel type and each line is permanently assigned an individual one of the time position channels. Connections are completed between calling and called lines by link connectors common to the lines of the system and which each have calling and called gates for controlling the connection of that link connector to the time position channels assigned to the calling and called lines, respectively. That is, speech signal samples received from the calling and called lines by a link connector are demodulated and retransmitted in the time positions of the called and calling lines, respectively, to the called and calling lines.

In the above-identified application, the transfer of information from the lines to the link connectors and from the link connectors to the lines is of the resonant transfer type. A series resonant circuit is completed between a capacitor and an inductor forming the end elements of a low-pass filter in the line terminating unit and a capacitor and an inductor forming the end elements of a low-pass filter in the link connector when the gate which connects the line terminating unit to the network and the gate which connects the link connector to the network are simultaneously operated. Theoretically, if the period of time that the gates are closed is exactly equal to one-half the natural period of oscillation of the above-described capacitors and inductors, all of the energy is transferred from one capacitor to the other and the transfer is, therefore, lossless. In practice, however, it has been found that because of the inherent resistance of the gates, the loss in the low-pass filters, and because of the difficulty in controlling the gates to operate for precisely the required time period, the transfer is not lossless and amplifiers must necessarily be used throughout the system.

Accordingly, it is the general object of this invention to provide a new and improved information transfer circuit.

It is a further object of this invention to provide a new and improved communication system of the time division multiplex type.

It is a more particular object of this invention to provide a new and improved information transfer circuit which is lossless and may in fact be used to introduce gain in the voice path of a communication system of the time division multiplex type.

Briefly, the present invention accomplishes the above cited objects by providing an information transfer circuit which comprises a variable parameter reactor, which may be a voltage controlled variable capacitor, a linear inductor of the type in which the inductance may be changed by applying a controlling field, or a square loop inductor or capacitor which stores a flux setting which may be changed by a controlling field, as the storage element. In accordance with the present invention, energy from a source of signals, which may be a telephone transmitter, is stored in the reactor, the variable parameter of the reactor is then varied to increase the energy in the reactor, and a switch or gate is then operated to transfer energy from the reactor to a load. Since the energy after the parametric change in the reactor field is proportional to the original energy deposited by the signal, the signal is amplified by the storage element.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise eight figures on three sheets.

Figure 7:
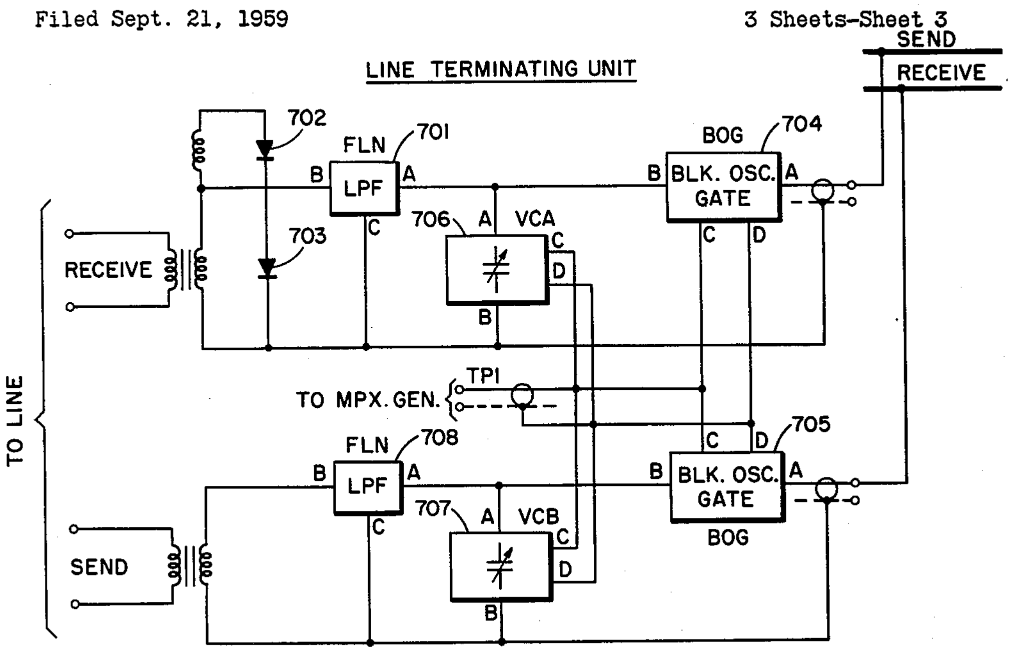
Figure 8:
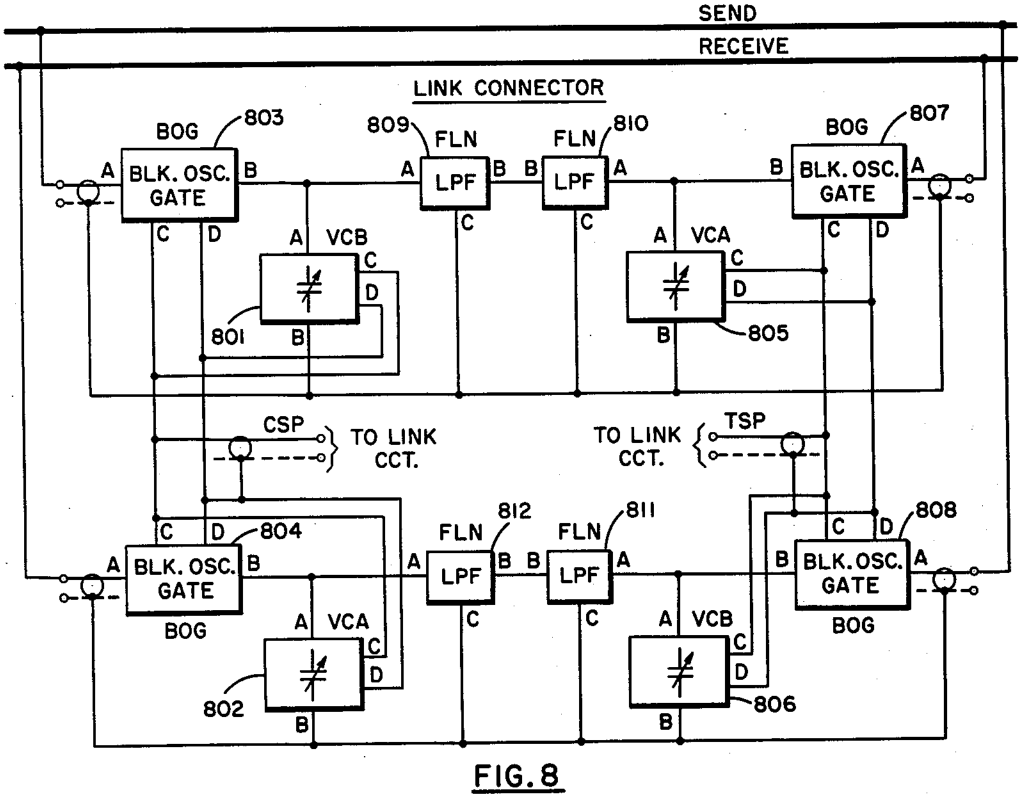

FIG. 1 shows, primarily in block form, the voice path of a communication system incorporating the present invention, FIGS. 2–5 show the logic symbols, together with a typical circuit represented by each symbol, which are used in the detailed circuit drawings of FIGS. 7 and 8, FIG. 6 is a graphic illustration of the characteristics of a variable capacitor, FIG. 7 shows circuit details of a line terminating unit, and FIG. 8 shows circuit details of a link connector.

It is believed that the general operation of the information transfer circuit which forms the subject matter of this invention and the illustrated embodiment of the invention can best be understood by referring to FIG. 1 of the drawings. As illustrated, the send portion of a calling line terminating unit 1 is interconnected with link connector 3 by the send conductors of a four-wire transmission highway network, and link connector 3 is interconnected with the receive portion of a called line terminating unit 2 by the receive conductors of the transmission network. In the system disclosed in the aforementioned communication system application, Serial No. 814,926, each highway comprises thirty-two time division channels, the master oscillator or clock source has a frequency of 400 kc., each channel is 1.25 microseconds in width, and there is a guard time of 1.25 microseconds between channels so that each time position frame is 80 microseconds in duration, and each line is scanned at a frequency of 12.5 kc. Thus, assuming that a call is in progress between the line terminated by line terminating unit 1 and the line terminated by line terminating unit 2 and that link connector 3 has been assigned for use on the call and has read in and stored the time position identities of the calling and called units in the manner described in the above-identified copending application, switches S1 and S2 are simultaneously closed in the time position assigned to the calling unit for approximately 1.25 microseconds in each 80 microsecond frame period. Similarly, switches S3 and S4 are closed in the time position assigned to the called unit in each time position frame period.

During each 78.75 microsecond period while switch S1 is open, voice frequency signals received from signal source 4, which may be a telephone transmitter, are coupled through low-pass filter 6 and variable capacitor 7 is charged in accordance with the amplitude of said signals. The capacitance of capacitor 7 is maintained at a relatively high value during the charging period and, shortly before each operation of switch S1, the capacitance of capacitor 7 is abruptly changed to a relatively low value.

The charge $Q_0$ on capacitor C7 before the change in capacitance of capacitor 7 was $$Q_0=V_7C_7$$

and does not change when the capacitance of capacitor 7 is varied. The energy applied by the signals to capacitor 7 is $$E=\tfrac{1}{2}C_7V_7^2=\tfrac{1}{2}Q_0V_7=Q_0^2/2C_7$$

If the capacitance of capacitor 7 is now changed to $C_{7'}$, the energy on capacitor 7 becomes $$E=Q_0^2/2C_{7'}$$

indicating that the energy is multiplied by the ratio of the initial capacitance of capacitor 7 to its final value.

When switches S1 and S2 close during the time position assigned to line terminating unit 1, capacitors 7 and 8 are connected in series and, if the capacitance of capacitor 8 is equal to $C_{7'}$, the charge on capacitor 7 will divide equally between capacitors 7 and 8. The resulting energy in capacitor 8 is then $$E=\left(\frac{Q_0}{2}\right)^2/2C_{7'}=Q_0^2/8C_{7'}$$

Thus, it can be seen that if the capacitance of capacitor 7 had been reduced by just a factor of 4, the energy applied to capacitor 8 would exactly equal the energy applied to capacitor 7 by the signal. If the capacitance of capacitor 7 is reduced by more than a factor of 4, the single storage stage comprising capacitor 7 provides a gain greater than one. With the circuits described more fully hereinafter and using standard available components, factor of 10 capacitor changes have been achieved. The factor of 10 capacitance change, of course, results in the transfer to capacitor 8 of 2.5 times the energy stored in capacitor 7 by the signal. The voltage on capacitors 7 and 8 equalizes before switches S1 and S2 open. If further amplification is desirable, the capacitance of capacitor 8 may be reduced immediately after switch S2 opens to produce gain in exactly the same manner as just described for capacitor C7. The amplified signal samples applied to capacitor 8 are demodulated in low-pass filter 9 and the demodulated signals are coupled through low-pass filter 10 to charge storage capacitor 11. Switches S3 and S4 are closed during the time position of the called unit to transfer energy from capacitor 11 to capacitor 12, the signal samples applied to capacitor 12 are demodulated in low-pass filter 13 and applied to load 14, which may be a telephone receiver. Ideally, filter 13 is so designed that all of the energy stored in capacitor 12 is transferred to the load 14 during the period of time between successive closings of gates S3 and S4 so that the charge on capacitor 12 is zero at the time that said switches are closed. The above illustrates the one-way transmission of speech signals between two parties. The opposite direction of speech transmission is accomplished in exactly the same manner with the use of duplicate equipment as will be apparent from the description of the line terminating unit and the link connector illustrated in FIGS. 7 and 8, respectively. It is to be noted that in systems where the time position channels of the highway are not permanently assigned to the line terminating units but, rather, are assigned to the calling and called units when a call is initiated, link connector 3 is eliminated and the send portion of the calling line terminating unit works directly into the receive portion of the called unit. A system of this type is disclosed in copending application Serial Number 721,241, filed March 13, 1958 and assigned to the same assignee as the present invention.

Before proceeding to describe the detailed operation of the line terminating unit and the link connector of FIGS. 7 and 8, which have been illustrated in logic schematic form, it is believed expedient to a more complete understanding of the invention to briefly describe, where necessary, the operation of the various circuit components represented by the logic symbols.

*Blocking Oscillator Gate BOG*

Figure 2A:
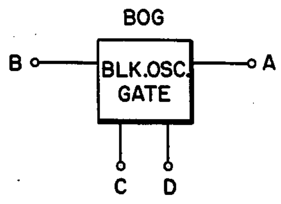
Figure 2B:
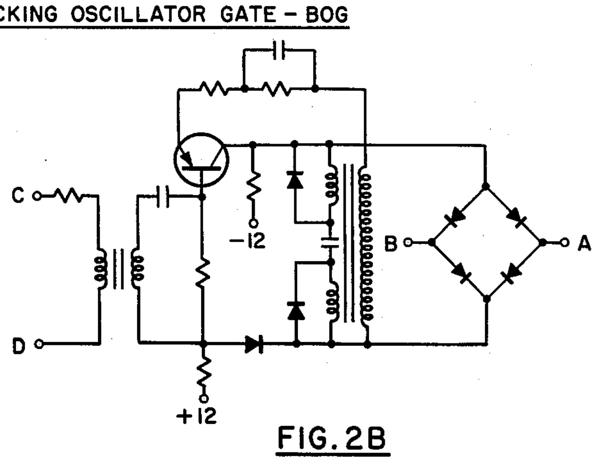

The logic symbol for blocking oscillator gate BOG is shown in FIG. 2A and a typical circuit represented by said symbol is shown in FIG. 2B. The illustrated circuit comprises a diode bridge in which the individual diodes of the bridge are normally biased in the reverse direction so as to present a very high impedance and thus prevent the transfer of energy between terminals B and A. The bridge diodes are biased in the forward direction to present a very low impedance and thus permit the transfer of energy between terminals A and B only when the blocking oscillator transistor is conductive. As used in both the line terminating units and the link connectors, the blocking oscillator transistor is triggered into conduction by the leading edge of a time position defining pulse applied across terminals C and D and the time constant of the blocking oscillator is such that the transistor is conductive and the bridge diodes are biased in the forward direction for a period of time slightly less than 1.25 microseconds regardless of the duration of the input pulse. A complete detailed description of the operation of blocking oscillator gate BOG may be found in copending application Serial Number 813,193, filed May 14, 1959 and assigned to the same assignee as the present invention.

*Low-Pass Filter FLN*

Figure 3A:
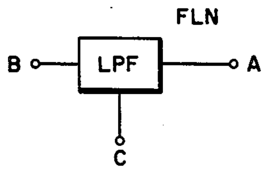
Figure 3B:
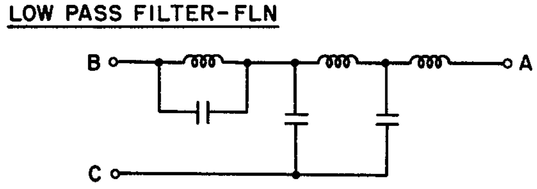

The logic symbol for low-pass filter FLN is shown in FIG. 3A and a typical circuit represented by said symbol is shown in FIG. 3B. The conventionally designed unbalanced filter has a nominal cutoff at 6 kc., is driven by a six thousand ohm generator, and works into an open circuit load. The insertion loss of the filter is 1 db maximum up to 4 kc.

*Variable Capacitor VCA*

The logic symbol for variable capacitor VCA is shown in FIG. 4A and a typical circuit represented by said symbol is shown in FIG. 4B. As illustrated, the variable capacitor comprises unidirectional conducting devices 401 and 402, which may be silicon diodes, connected in series with transformer secondary windings **403*a* and 403*b*, respectively, between terminals A and B. Also, as illustrated, diodes 401 and 402 are forward biased by batteries 404 and 405. As shown in FIG. 6, when batteries 404 and 405 have a combined voltage of one-half volt and are connected in the forward biasing direction, the combined capacitance of diodes 401 and 402 is approximately 1900 micromicrofarads. As used in the illustrated system, the time position defining pulse, which is utilized to trigger the blocking oscillator gate, is also used to alter the capacitance of the variable capacitor comprising diodes 401 and 402. When a negative-going pulse is applied across terminals C and D of primary winding 403, diodes 401 and 402 are reverse biased and, if the voltage induced in each of the windings 403*a* and 403*b*** has a value of approximately 4.25 volts, the capacitance of the variable capacitor becomes approximately 200 micromicrofarads, as shown in FIG. 6. Since the blocking oscillator gate, previously described, has a measurable turn on time and since the time constant of that circuit is slightly less than 1.25 microseconds, the capacitance of variable capacitor VCA is changed from a relatively high value to a relatively low value immediately preceding each operation of the gate and is returned to said relatively high value immediately following each operation of the gate. Two diodes are used in the variable capacitor so that the pulse applied to terminals C and D does not appear at terminal A and the carrier signal is thus prevented from appearing in the transmission information signal.

*Variable Capacitor VCB*

The logic symbol for variable capacitor VCB is shown in FIG. 5A and a typical circuit represented by said symbol is shown in FIG. 5B. Variable capacitor VCB differs from variable capacitor VCA, described above, only in that the bias is reversed so that the capacitor normally has a relatively low capacitance value and is periodically varied to a relatively high capacitance value. It can be seen that batteries 501 and 502 normally bias diodes 503 and 504 in the reverse direction and that a pulse applied across terminals C and D serves to bias diodes 503 and 504 in the forward direction and thus increase their capacitance.

*Line Terminating Unit*

A line terminating unit, identical to the unit shown in detail in FIG. 7, is used to terminate each line of the system. As illustrated, signals received over the receive conductors of the four-wire line are coupled to terminal B of low-pass filter 701. The maximum swing of the received signals is limited by back-to-back connected Zener diodes 702 and 703 so as to prevent false operation of blocking oscillator gate 704.

As explained in the description of FIG. 1, each line terminating unit is permanently assigned a particular one of the thirty-two time division channels of the transmission highway network. The illustrated line terminating unit has been shown as permanently assigned time position channel 1. That is, blocking oscillator gates 704 and 705 are closed only during time position 1 in each frame of the recurring pulse frames generated by the master multiplex pulse generator, as determined by the connection of time position 1 conductor TP1 to the C terminals of said gates. The signals coupled to terminal B of low-pass filter 701 and which appear at terminal A of said filter, serve to charge variable capacitor 706 in accordance with the amplitude of said signals. As previously explained, immediately preceding the operation of gate 704 during time position 1 in each time position frame, the capacitance of variable capacitor 706 is reduced to increase the energy stored in said capacitor, and when gate 704 and the calling gates in the assigned link connector are closed, the energy stored in capacitor 706 is transferred over the send conductors of the highway transmission network to the assigned link connector. Simultaneously therewith, energy stored in the assigned link connector is transferred over the receive conductors of the highway transmission network and through gate 706 to charge variable capacitor 707. It is to be noted that capacitor 707 may be variable if further gain is desired or may be fixed if sufficient gain is provided by the transmitting variable capacitor. Of course, it is also possible to vary the capacitance of only the receiving variable capacitor while the capacitance of the transmitting capacitor is fixed. In any case, however, it is desirable that the capacitance of capacitor 707 be equal to the capacitance of the transmitting capacitor while the gates are closed to achieve the maximum transfer of energy.

The demodulated signals appearing at terminal B of low-pass filter 708 are applied to the send conductors of the line and are thus transmitted either to a subscriber station or a distant office.

*Link Connector*

A link connector, identical to the one shown in FIG. 8, is provided in each link circuit of the system. As fully described in the above-identified copending application, the link circuit assigned to a particular call serves to apply a time position defining pulse in the time position of the calling line associated with that call to calling slot pulse conductor CSP and a time position defining pulse in the time position of the called unit associated with that call to terminating slot pulse conductor TSP once each time position frame for the duration of the call.

The leading edge of each pulse applied to conductor CSP is utilized to vary the capacitance of variable capacitors 801 and 802 and to trigger blocking oscillator gates 803 and 804. Similarly, the leading edge of each pulse applied to conductor TSP is utilized to vary the capacitance of variable capacitors 805 and 806 and to trigger blocking oscillator gates 807 and 808. Transmission from the calling unit to the called unit is achieved in the following manner. Signal samples received over the send conductors of the transmission network in the time position of the calling unit are coupled through gate 803, stored in capacitor 801, the energy stored in capacitor 801 is transferred through low-pass filters 809 and 810 to charge storage capacitor 805, and energy stored in capacitor 805 is transferred through gate 807 to the receive conductors of the highway in the time position of the called unit. Transmission from the called unit to the calling unit is accomplished in the following manner. Signal samples received over the send conductors of the transmission highway network in the time position of the called unit are coupled through gate 808, stored in capacitor 806, the energy stored in capacitor 806 is transferred through low-pass filters 811 and 812 to charge storage capacitor 802, and energy stored in capacitor 802 is transferred through gate 804 to the receive conductors of the transmission highway network in the time position of the calling unit.

It is believed apparent that the present invention has many applications other than the illustrated communication system voice path application. Other possible applications include transfer circuits in digital logic circuits and synchronous amplifiers in pulse transmission system. Also, there may be systems applications where the output of a single storage element is connected directly to a load.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In combination, a source of signals, a load, a variable parameter reactor, means for storing energy from said source of signals in said reactor, means for thereafter varying the variable parameter of said reactor to increase the energy stored in said reactor, and means coupled between said reactor, and said load for transferring the energy stored in said reactor to said load only after the variable parameter of said reactor has been varied.

2. In combination, a source of signals, a load, a variable parameter reactor, a switch interposed in a connection between said reactor and said load, means for storing energy from said source of signals in said reactor, means for thereafter varying the variable parameter of said reactor to increase the energy stored in said reactor, and means for thereafter closing said switch to transfer energy stored in said reactor to said load.

3. In combination, a source of signals, a load, a variable capacitor, a switch interposed in a connection between said capacitor and said load, means for storing energy from said source of signals in said capacitor, means for thereafter lowering the capacitance of said capacitor to increase the energy stored in said capacitor, and means for thereafter closing said switch to transfer energy from said capacitor to said load.

4. In combination, a source of signals, a load, a variable parameter reactor, a switch interposed in a connection between said reactor and said load, means for storing energy from said source of signals in said reactor over a relatively long period of time, means for thereafter varying the variable parameter of said reactor to increase the energy stored in said reactor, and means for thereafter closing said switch for a relatively short period of time to transfer energy stored in said reactor to said load.

5. In combination, a source of signals, a load, a reactor having a parameter variable between first and second values, a switch interposed in a connection between said reactor and said load, means for storing energy from said source of signals in said reactor while said parameter is at said first value, means for thereafter varying the variable parameter of said reactor to said second value to increase the energy stored in said reactor, means for thereafter momentarily closing said switch to transfer energy stored in said reactor to said load, and means for returning the variable parameter of said reactor to said first value after said switch is opened.

6. In combination, a source of signals, a load, means for assigning an individual time position which recurs in repetitive time position frames to said switch, a first reactor having a parameter variable between first and second values, a second reactor, a switch interposed in a connection between said first reactor and said second reactor, means for storing energy from said source of signals in said first reactor, means for maintaining the variable parameter of said first reactor at said first value for substantially all of the frame period exclusive of the time position assigned to said switch, means for varying the variable parameter of said first reactor to said second value to increase the energy stored in said first reactor, means for operating said switch during the occurrence of the time position assigned to said switch to transfer energy from said first reactor to said second reactor, and means for transferring all of the energy stored in said second reactor to said load between successive operations of said switch.

7. In combination, a source of signals, a load, means for assigning an individual time position which recurs in repetitive time position frames to said switch, a first reactor, a second reactor having a parameter variable between first and second values, a switch interposed in a connection between said first reactor and said second reactor, means for storing energy from said source of signals in said first reactor, means for operating said switch during the occurrence of the time position assigned to said switch to transfer energy from said first reactor to said second reactor, means for maintaining the variable parameter of said second reactor at said first value while said switch is operated, and means for varying the variable parameter of said second parameter to increase the energy stored in said second parameter following each operation of said switch.

8. In combination, a source of signals, a first reactor having a parameter variable between first and second values, means for connecting said first reactor in shunt with said source of signals, a load, a second reactor, means for connecting said second reactor in shunt with said load, a switch interposed in a connection between said first reactor and said second reactor, means for closing said switch during an individual time position which recurs in repetitive time position frames to transfer energy from said first reactor to said second reactor, means for maintaining the variable parameter of said first reactor at said first value for substantially all of the frame period while said switch is open and while energy from said source of signals is stored in said first reactor, means for varying the variable parameter of said first reactor to said second value to increase the energy stored in said first reactor prior to each closure of said switch, and means for controlling the complete transfer of the energy stored in said second reactor to said load during the time that said switch is open.

9. In a communication system, a line, a line terminating unit, a transmission highway network of the time position channel type, means for assigning a channel of said network to said unit, said unit comprising a low-pass filter having input and output terminals, a reactor having a parameter variable between first and second values, and a gate, means for coupling said line to the input terminals of said filter, means for connecting said reactor across the output terminals of said filter, means for interposing said gate in a connection between the output terminals of said filter and said network, means for operating said gate to connect said unit to said network to thereby transfer energy stored in said reactor to said network during the time position of the channel assigned to said unit, means for maintaining the variable parameter of said reactor at said first value for substantially all of the time period while said gate is not operated, and means for varying the variable parameter of said reactor to said second value to increase the energy stored in said reactor prior to each operation of said gate.

10. In a communication system, a line, a line terminating unit, a transmission highway network of the time position channel type, means for assigning a channel of said network to said unit, said unit comprising a low-pass filter having input and output terminals, a variable capacitor, and a pulse operated gate, means for coupling said line to the input terminals of said filter, means for connecting said capacitor across the output terminals of said filter, means for interposing said gate in a connection between the output terminals of said filter and said network, means for developing a first pulse in the time position of the channel assigned to said unit, means for applying said first pulse to said gate to operate said gate and thereby transfer energy from said capacitor to said network, means for maintaining the capacitance of said capacitor at a relatively high value for substantially all of the time period while said gate is not operated, and means for varying the capacitance of said capacitor to a relatively low value prior to each operation of said gate.

11. The system of claim 10 in which said variable capacitor comprises first and second semiconductor unidirectional conducting devices each having first and second terminals, means for connecting the first terminal of said first device and the second terminal of said second device to one of the output terminals of said filter, a transformer having first, second, and third windings, means for connecting said first winding between the second terminal of said first device and the other output terminal of said filter, means for connecting said second winding between the first terminal of said second device and said other output terminal of said filter, means for applying a second pulse which overlaps said first pulse to said third winding, and said windings being so poled that said devices are biased in the reverse direction when said second pulse is applied to said third winding.

12. In a communication system, a line, a line terminating unit, a transmission network of the time position channel type and having send and receive conductors, means for assigning a channel of said network to said unit, said unit comprising first and second low-pass filters each having input and output terminals, a first reactor having a parameter variable between first and second values, a second reactor, and first and second gates, means for coupling said line to the input terminals of said first filter and to the output terminals of said second filter, means for connecting said first reactor across the output terminals of said first filter, means for connecting said second reactor across the input terminals of said second filter, means for interposing said first gate in a connection between the output terminals of said first filter and the send conductors of said network, means for interposing said second gate in a connection between the receive conductors of said network and the input conductors of said second filter, means for operating said first and second gate to connect said unit to said network during the time position of the channel assigned to that unit to thereby transfer energy from said first reactor to said send conductors and to transfer energy over said receive conductors to said second reactor, means for maintaining the variable parameter of said first reactor at said first value for substantially all of the time period while said gates are not operated, and means for varying the variable parameter of said first reactor to said second value to increase the energy stored in said first reactor prior to each operation of said gates.

13. In a communication system, first and second circuits, a transmission highway network of the time division channel type interconnecting said first and second circuits, said first circuit comprising a first low-pass filter having input and output terminals, a first reactor having a parameter variable between first and second values, and a first gate, said second circuit comprising a second low-pass filter having input and output terminals, a second reactor, and a second gate, a source of voice frequency signals, a load, means for coupling said source of signals to the input terminals of said first filter, means for connecting said first reactor across the output terminals of said first filter, means for interposing said first gate in a connection between the output terminals of said first filter and said network, means for interposing said second gate in a connection between said network and the input terminals of said second filter, means for connecting said second reactor across the input terminals of said second filter, means for connecting said load across the output terminals of said second filter, means for assigning a channel of said network to said first and second circuits, means for operating said first and second gates to connect said first and second circuits, respectively, to said network during the time position of the channel assigned to said circuits to thereby transfer energy stored in said first reactor to said second reactor, means for maintaining the variable parameter of said first reactor at said first value for substantially all of the time period while said first and second gates are not operated, and means for varying the variable parameter of said first reactor to said second value to increase the energy stored in said first reactor prior to each operation of said gates.

14. The system of claim 13 in which said second reactor has a parameter variable between first and second values, means for maintaining the variable parameter of said second reactor at its first value during the time that said first and second gates are operated, and means for varying the variable parameter of said second reactor to increase the energy stored in said second reactor following each operation of said first and second gates.

15. In a communication system, first and second circuits, a transmission network of the time division channel type interconnecting said first and second circuits, said first circuit comprising a first low-pass filter having input and output terminals, a first variable capacitor, and a first gate, said second circuit comprising a second low-pass filter having input and output terminals, a second capacitor, and a second gate, a source of voice frequency signals, a load, means for coupling said source of signals to the input terminals of said first filter, means for connecting said first capacitor across the output terminals of said first filter, means for interposing said first gate in a connection between the output terminals of said first filter and said network, means for interposing said second gate in a connection between said network and the input terminals of said second filter, means for connecting said second capacitor across the input terminals of said second filter, means for connecting said load across the output terminals of said second filter, means for assigning a channel of said network to said first and second circuits, means for operating said first and second gates during the time position of the channel assigned to said circuits to connect said first and second circuits, respectively, to said network to thereby transfer energy from said first capacitor to said second capacitor, means for maintaining the capacitance of said first capacitor at a relatively high value for substantially all of the time period while said first and second gates are not operated, and means for maintaining the capacitance of said first capacitor at a relatively low value during the time that said gates are operated.

16. The system of claim 15 in which said second capacitor is a variable capacitor and including means for maintaining the capacitance of said second capacitor at a relatively high value during the time that said gates are operated, and means for maintaining the capacitance of said second capacitor at a relatively low value for substantially all of the time period while said gates are not operated.

17. The system of claim 15 in which the relatively low value of capacitance of the first capacitor is substantially equal to the relatively high value of capacitance of the second capacitor.

References Cited in the file of this patent

UNITED STATES PATENTS

| | | |
|---|---|---|
| 2,616,989 | Hepp | Nov. 4, 1952 |
| 2,718,621 | Heard et al. | Sept. 20, 1955 |
| 2,750,454 | Melville | June 12, 1956 |
| 2,773,934 | Trousdale et al. | Dec. 11, 1956 |
| 2,835,747 | Cluwen | May 20, 1958 |

UNITED STATES PATENT OFFICE
CERTIFICATE OF CORRECTION

Patent No. 3,061,681 October 30, 1962

Glenn L. Richards

It is hereby certified that error appears in the above numbered patent requiring correction and that the said Letters Patent should read as corrected below.

Column 6, line 27, for "system" read -- systems --; line 45, after "reactor" strike out the comma; column 10, line 33, for the claim reference numeral "15" read -- 16 --.

Signed and sealed this 23rd day of April 1963.

(SEAL)
Attest:

ERNEST W. SWIDER
Attesting Officer

DAVID L. LADD
Commissioner of Patents